(12) United States Patent
Wawra

(10) Patent No.: US 7,613,791 B2
(45) Date of Patent: Nov. 3, 2009

(54) METHOD FOR TRANSMITTING INFORMATION OVER A RADIO NETWORK AND FOR REPRESENTING THE INFORMATION BY MEANS OF A MOBILE TRANSMITTING/RECEIVING STATION

(75) Inventor: Martin Wawra, Duesseldorf (DE)

(73) Assignee: Robert Bosch GmbH, Stuttgart (DE)

( * ) Notice: Subject to any disclaimer, the term of this patent is extended or adjusted under 35 U.S.C. 154(b) by 906 days.

(21) Appl. No.: 10/220,919

(22) PCT Filed: Feb. 16, 2001

(86) PCT No.: PCT/DE01/00573

§ 371 (c)(1),
(2), (4) Date: Nov. 12, 2002

(87) PCT Pub. No.: WO01/67703

PCT Pub. Date: Sep. 13, 2001

(65) Prior Publication Data

US 2003/0224800 A1 Dec. 4, 2003

(30) Foreign Application Priority Data

Mar. 7, 2000 (DE) .................................. 100 10 965

(51) Int. Cl.
*G06F 13/00* (2006.01)
(52) U.S. Cl. .................... 709/219; 709/223; 719/329
(58) Field of Classification Search ................ 709/217, 709/219, 246, 223, 224; 719/328, 329
See application file for complete search history.

(56) References Cited

U.S. PATENT DOCUMENTS

| 5,870,030 | A | 2/1999 | Deluca et al. |
| 6,195,677 | B1* | 2/2001 | Utsumi ........................ 709/201 |
| 6,311,180 | B1* | 10/2001 | Fogarty .......................... 707/4 |
| 6,449,638 | B1* | 9/2002 | Wecker et al. .............. 709/217 |
| 6,480,711 | B1* | 11/2002 | Guedalia .................. 455/412.1 |
| 6,484,148 | B1* | 11/2002 | Boyd .......................... 705/14 |
| 6,763,460 | B1* | 7/2004 | Hild et al. .................... 713/161 |
| 6,873,841 | B1* | 3/2005 | Sagar ....................... 455/414.4 |
| 2002/0077130 | A1* | 6/2002 | Owensby ..................... 455/466 |
| 2002/0107985 | A1* | 8/2002 | Hwang et al. ............... 709/246 |

OTHER PUBLICATIONS

Andreas Fasbender, Frank Reichert: "Any Network, Any Terminal, Anywhere" IEEE Personal Communications, Apr. 1, 1999 pp. 22-30.
"Digital Cellular Telecommunications System (Phase 2+); Mobile Station Execution Environment (MexE); Service Description; Stage 1 (GSM 02.57 version 7.1.0 Release 1998) ETSI TS 101 741 v7.1.0" European Telecommunication Standard, XX, XX, Aug. 1999, pp. 1-21.

* cited by examiner

*Primary Examiner*—Viet Vu
(74) *Attorney, Agent, or Firm*—Kenyon & Kenyon LLP

(57) ABSTRACT

A method of transmitting information over a wireless network and representing the information by using a mobile transceiver station as well as a data carrier are described, wherein information is offered and transmitted in a scalable form for the requirements of a mobile transceiver station. A scaling of the information is selected, depending on the arrangement for representation of information of the mobile transceiver station, inputs by the user being taken into account. WAP is used for transmission of the information data. A mobile transceiver station signals which scalings are to be transmitted. Advertising in various scalings is used for billing for services used.

6 Claims, 1 Drawing Sheet

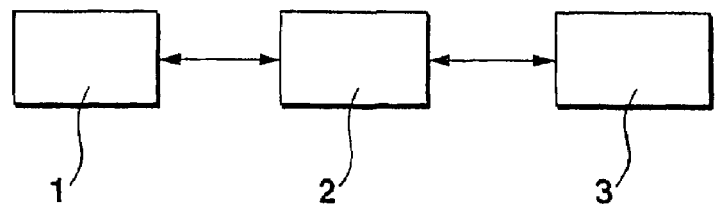
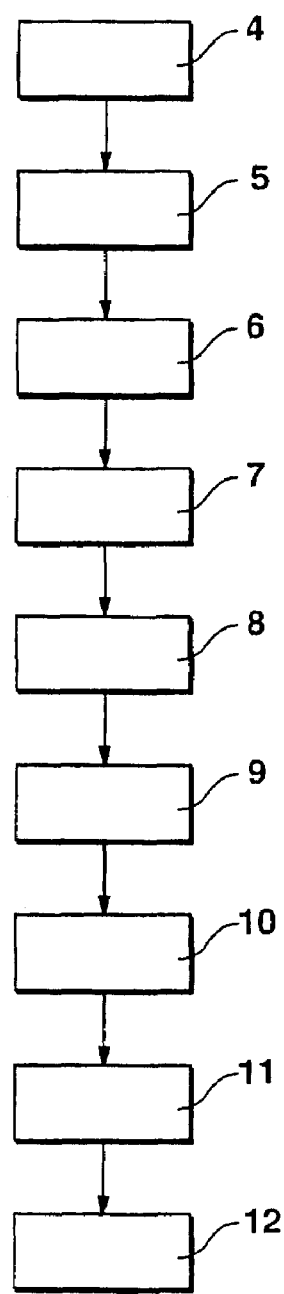

METHOD FOR TRANSMITTING INFORMATION OVER A RADIO NETWORK AND FOR REPRESENTING THE INFORMATION BY MEANS OF A MOBILE TRANSMITTING/RECEIVING STATION

FIELD OF THE INVENTION

The present invention relates to a method of transmitting information over a wireless network and representing the information by using a mobile transceiver station and a data carrier.

BACKGROUND INFORMATION

WAP (Wireless Application Protocol) may be used for loading Internet web sites for mobile terminals. Such mobile terminals may include mobile telephones in particular. Mobile telephones may have less powerful processors, less memory, a limited power supply, smaller displays and may not have a full keyboard in comparison with computers. In addition, the wireless network may have a smaller bandwidth than comparable fixed networks. The stability of the connection may also be lower in comparison with fixed networks, so the data may be required to be reformatted to a reduced data format for WAP. The multimedia content of Internet web sites may therefore be translated for WAP and the data may be reduced. Mobile telephones may have a microbrowser suitable for viewing these WAP sites.

It is discussed in A. Fasbender et al., "Any Network, Any Terminal, Anywhere," IEEE Personal Communications, April 1999, pages 22 through 30, that only one scaling of information requested that is suitable for the mobile station may be transmitted from an intelligent gateway to a mobile station.

SUMMARY OF THE INVENTION

An example method according to the present invention of transmitting information over a wireless network and representing the information by using a mobile transceiver station and the data carrier may provide that the information is offered in various scalings so that a suitable scaling for representing the information via the transceiver station may be selected, depending on the available representation options.

The different scalings may be provided with a marking so that the respective scaling may be selected easily. The representation of the information may thus be adapted to the arrangement for representing information available on a user's terminal.

A user may select scalings independently via inputs on his transceiver station. The user may select the scaling having a smaller extent than the maximum allowed by his mobile transceiver station. Therefore, a user may increase the speed of representation and optionally the data transmission rate by selecting a scaling which requires a less complex representation and thus less data may need to be transmitted and the representation may be generated using less data.

An open standard for transmission in the form of WAP may be used, so that the example method according to the present invention may become independent of the respective terminals used. This may ensure more widespread use of the example method according to the present invention.

The scalable information may be reformatted in accordance with WAP, so the data of the information may be transmitted easily using WAP.

The mobile transceiver station and a base station signal may mutually determine which scaling the mobile transceiver station would like to receive, so that the need for bandwidth may be optimized. The requirements and the equipment of the mobile transceiver station may play a predominant role here because only information that is actually representable may be transmitted and not all scalings. This may permit a considerable saving in terms of bandwidth.

Finally, use of the example method according to the present invention for transmission of advertising for billing for services may be used because advertising may be a suitable arrangement for financing information services that are otherwise available at no cost. In addition, this may expand the spectrum of potential customers. In one example refinement, services may be billed as a function of the scaling selected. In this manner, when the representation of the advertising is better and more complex, more of the cost of the services used may be covered by viewing the advertising. This may be based on the idea that a more complex representation of advertising has a greater influence on an observer than advertising represented in a less complex manner.

BRIEF DESCRIPTION OF THE DRAWINGS

FIG. 1 schematically shows access of a mobile transceiver station to Internet web sites.

FIG. 2 illustrates an example method according to the present invention of transmitting information and representing such information by using a mobile transceiver station.

DETAILED DESCRIPTION

Mobile transceiver stations such as mobile telephones may be constantly expanded with regard to their functionalities. A large area of applications may be for retrieving information in a manner that people are accustomed to when using the Internet. The expansion of this function may concern in particular the display of graphics, video and the possibility of interaction with the information displayed. Advertising may therefore be particularly suitable for financing this information. Many companies involved in the Internet may finance their activities exclusively from advertising.

Because of their limited bandwidth, these wireless networks may not be suitable for transmitting entire web sites in a quality and within a period of time acceptable for a user. The equipment and arrangement for representing information on a mobile transceiver station also may not conform to those of a traditional computer. Therefore, the present invention may reduce or adapt the data to be represented so that it may be adjusted to the different transceiver stations of users to achieve a suitable type of representation in each case.

Therefore, according to the present invention information to be represented may be offered in different scalings which may be selected according to the options of the mobile transceiver stations for representation. These different scalings may concern the type of representation. The scalings may be provided with marks so that the individual scalings may be retrieved easily on the basis of these marks. In an example embodiment and/or example method, a user may select a scaling which is acceptable for his mobile transceiver station through inputs on his mobile transceiver station. In addition, WAP may be used as the information transmission method, in which case the information may then be reformatted by WAP for advertising. As an alternative, the mobile transceiver station may signal to a base station which scaling of information it would like to receive.

FIG. 1 schematically shows access of a mobile transceiver station to Internet web sites. A WWW (World Wide Web) server, i.e., a computer permitting access to information on the Internet, is contacted by a WAP gateway 2 because WAP gateway 2 has been queried by a mobile transceiver station 3 to determine which Internet sites are to be transmitted to mobile transceiver station 3. A WAP gateway may be a computer, namely in this case the base station, which establishes the connection of the wireless network to the Internet. It thus acts like a translator and also functions as the base station for mobile transceiver 3, and it is also able to serve a plurality of mobile transceiver stations.

If WWW server 1 locates the Internet information requested, then WWW server 1 transmits this information to WAP gateway 2. WWW server 1 transmits all the available scalings of the requested information, in particular advertising. WAP gateway 2 translates the data received by WWW server 1 into the WAP-specific format. The data is then transmitted over a wireless network from WAP gateway 2 to mobile transceiver station 3 via a connected base station. Transceiver station 3 then determines which scaling of the received data is suitable for the representation, doing so on the basis of the an arrangement available to it for representing information with respect to the display and acoustic playback. This scaling is then selected on the basis of a mark provided to ultimately reproduce the received information on a display and/or by acoustic playback.

As an alternative, mobile transceiver station 3 may notify WAP gateway 2 as to which scaling it would like to have. Then WAP gateway 2 selects the scaling from the data received from WWW server 1. This may utilize the computing capacity of WAP gateway 2, which may be superior to that of mobile transceiver station 3.

In an example refinement, it may also be provided that through inputs on his mobile transceiver station 3, a user of mobile transceiver station 3 selects an acceptable scaling for his mobile transceiver station 3. This selection is then made in mobile transceiver station 3 itself or is forwarded to WAP gateway 2. The inputs are made by the user by using available means for data input on mobile transceiver station 3, namely by using a small keyboard provided here.

FIG. 2 illustrates an example method according to the present invention of transmitting information, in particular advertising, over a wireless network and representing information, in particular advertising, by using a mobile transceiver station 3. In method step 4, a data request is transmitted from mobile transceiver station 3 to WAP gateway 2 to retrieve information. WAP gateway 2 transmits this request to WWW server 1 so that WWW server 1 retrieves the corresponding information from the Internet. In method step 5, WAP gateway 2 receives from WWW server 1 the corresponding information or the acknowledging message that the requested information is not available. WAP gateway 2 then translates the received data into a WAP-compatible data format.

In method step 6, WAP gateway 2 transmits the translated data to mobile transceiver station 3 via the connected base station, and the transceiver station then selects from the received data the corresponding scaling for the information to be represented.

Table 1 below gives an example of the different types of scaling.

TABLE 1

| Mark | Functionality |
|---|---|
| 1 | monochromatic text |
| 2 | multi-color text |
| 3 | sound only |
| 4 | black-and-white object display |
| 5 | color object display |
| 6 | sound and object display |
| 7 | video data stream in QCIF |
| 8 | video data stream with audio in QCIF and 8 kHz audio bandwidth |
| 9 | video data stream with sound and text |
| 10 | video data stream in SVGA |
| 11 | video data stream with sound in SVGA and 96 kHz audio bandwidth |
| 12 | animated 3D objects |
| 13 | sound, video data streams, 3D objects and interactivity |

Table 1 shows a hierarchical breakdown of scaling of information to be represented. The hierarchy is derived from the complexity of the representation of the information. QCIF stands for Quarter Common Intermediate Format, which is an international standard for video display resolution used mainly for video conferences, displaying 176 pixels in groups of 144 lines on the display. SVGA stands for Super Video Graphics Array, an international standard for the resolution of computer monitors, where 800×600 pixels are shown on the display. Due to the different display standards and the different audio bandwidths, from telephone quality on the one hand to CD quality on the other hand, there may be significant differences in the extent of data, depending on the scaling.

On the basis of the marks, the corresponding scaling is selected for representing the information. The functionality indicates the representation option stored in the corresponding scaling. Depending on the possibilities of mobile transceiver station 3 and/or the user's wishes, the corresponding scaling is loaded and represented.

Mark 1 offers a simple representation of monochromatic text while mark 13 offers a multimedia representation using video, audio, 3D objects and interactivity for the user. Table 1 shows an example of different scalings of information. As an alternative, more or fewer scalings may be provided, in which case other differences in features may be differentiated, e.g., in the resolution of objects to be displayed. The different scalings may be already available on the Internet or WAP gateway 2 may calculate the other scalings from the form available on the Internet.

Thus the data carrier is either available on the Internet in WWW server 1 or WAP gateway 2 or in mobile transceiver station 3. The different scalings of information to be represented may be called up on the data carrier, which may be rewritable.

Instead of a transceiver station, a mobile slave station such as a car radio may also be used. In this case, however, all scalings of the information to be represented are transmitted to the slave station and then the corresponding scaling for the representation is selected according to the arrangement available for representing information (display, audio playback) or according to the user's inputs. This also includes a slave station, except for the case when mobile transceiver station 3 signals something to WAP gateway 2.

A combination of a car radio having a receiver for DAB (Digital Audio Broadcasting) and a mobile telephone, however, may achieve full functionality because there is also a reverse channel via the mobile telephone. In particular the combination of a broadband receiver, the DAB receiver, with a narrow-band reverse channel, the mobile telephone, may be attractive for a high data rate. DAB is a digital transmission method which may also be capable of transmitting other data in addition to digital audio programs. Related to DAB are DVB (Digital Video Broadcasting) and DRM (Digital Radio Mondial), which may also transmit other data in addition to digital radio programs.

Advertising is an information content which may be particularly suitable for different scalings. Advertising in extent and configuration may be used here for billing for services used. The user and/or the available information representation selects the corresponding scaling. The more comprehensive and complex the representation of the advertising, the greater may be the coverage of the cost of services used by viewing the advertising. Only the advertising may be in different scalings while information services are in one scaling, or at least advertising and other information may be differently scalable.

What is claimed is:

1. A method of transmitting information over a wireless network and representing the information in a multimedia form by using a mobile transceiver station, comprising:

generating the information in a plurality of alternative scalings;

transmitting the information over the wireless network to the mobile transceiver station in the plurality of alternative scalings adapted to the wireless network;

assigning a mark to each of the plurality of alternative scalings of the information;

selecting a suitable scaling among the plurality of alternative scalings in accordance with an arrangement for representing the information in the mobile transceiver station; and scaling the information as a function of the arrangement for representing the information in the mobile transceiver station.

2. The method according to claim 1, further comprising:

determining the multimedia form of the information by the arrangement for representing the information, according to user inputs.

3. The method according to claim 1, wherein a Wireless Application Protocol is used for transmission of the information.

4. The method according to claim 3, wherein the information is reformatted by the Wireless Application Protocol for transmission over the wireless network.

5. The method according to claim 1, wherein advertising is used as part of the information to be represented for billing for data received by the mobile transceiver station.

6. The method according to claim 5, further comprising:

creating the billing as a function of the selected scaling.

* * * * *

UNITED STATES PATENT AND TRADEMARK OFFICE
CERTIFICATE OF CORRECTION

PATENT NO. : 7,613,791 B2  Page 1 of 1
APPLICATION NO. : 10/220919
DATED : November 3, 2009
INVENTOR(S) : Martin Wawra It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this

Nineteenth Day of October, 2010

David J. Kappos
*Director of the United States Patent and Trademark Office*